United States Patent [19]

Castrantas et al.

[11] Patent Number: 5,030,359

[45] Date of Patent: Jul. 9, 1991

[54] DEWATERING SLUDGE

[75] Inventors: Harry M. Castrantas, Newton, Pa.; Frank E. Caropreso, Skillman, N.J.

[73] Assignee: FMC Corporation, Philadelphia, Pa.

[21] Appl. No.: 610,667

[22] Filed: Nov. 8, 1990

[51] Int. Cl.$^5$ .......................... C02F 1/24; C02F 1/38; C02F 11/14

[52] U.S. Cl. .................................. 210/705; 210/710; 210/737

[58] Field of Search ............... 210/703, 704, 705, 708, 210/710, 768, 787, 721, 727, 737

[56] References Cited

U.S. PATENT DOCUMENTS

| | | | |
|---|---|---|---|
| 2,328,361 | 8/1943 | Sanders | 210/710 |
| 3,763,038 | 10/1973 | Misaka et al. | 210/4 |
| 3,975,266 | 8/1976 | Baize | 210/10 |
| 4,340,487 | 7/1982 | Lyon | 210/705 |
| 4,559,146 | 12/1985 | Roets | 210/705 |
| 4,710,304 | 12/1987 | Lang | 210/734 |
| 4,738,783 | 4/1988 | Sugihara et al. | 210/705 |
| 4,744,903 | 5/1988 | McAninch et al. | 210/705 |
| 4,746,440 | 5/1988 | Seeger | 210/708 |
| 4,790,943 | 12/1988 | Dunn et al. | 210/705 |
| 4,902,429 | 2/1990 | Carpenter et al. | 210/704 |
| 4,913,826 | 4/1990 | Mannig et al. | 210/707 |
| 4,933,087 | 6/1990 | Markham, Jr. et al. | 210/626 |
| 4,966,713 | 10/1990 | Keys et al. | 210/705 |

OTHER PUBLICATIONS

Eckenfelder, W., *Water Quality Engineering for Practicing Engineers*, Barnes & Noble, Inc., NY (1970) pp. 84–85 and 124–125.

AFL Industries, Inc. Product Sheet (Thomas Register).

Kemmer, *The NALCO Water Handbook*, McGraw-Hill Book Company, N.Y. (1979) pp. 8-1 to 8-9 and 9-1 to 9-7.

*Primary Examiner*—Stanley Silverman
*Assistant Examiner*—Neil M. McCarthy
*Attorney, Agent, or Firm*—R. E. Elden; P. C. Baker; R. L. Andersen

[57] ABSTRACT

Fats and proteins in wastewater are commonly concentrated in a dissolved air flotation cell as a sludge ("skimmings") which has a very high water content, even after centrifuging or the like. A process is provided to reduce the water content of the sludge thereby reducing the cost of disposal of the sludge.

8 Claims, No Drawings

DEWATERING SLUDGE

This invention relates to purification of waste water containing fats and proteins. In particular, it relates to dewatering of sludge or skimmings from a dissolved gas flotation cell.

A large amount of wastewater with a high protein and fat content is produced in fish canneries, red meat slaughter and processing plants, and poultry slaughter and processing plants. These wastewaters are commonly processed by (a) pretreatment of the wastewaters in a Dissolved Air Flotation (DAF) cell operated with or without chemical coagulants and flocculants in which air is injected under pressure and subsequently the pressure is decreased, producing a primary float sludge or "skimmings" (also termed "DAF waste sludge") followed by (b) biological oxidation under facultative or aerobic conditions, or biological reduction under anaerobic conditions to produce biological sludges.

According to U.S. Pat. No. 4,933,087, addition of chemical coagulants and flocculants in the dissolved air flotation process is preferred because these additives float additional proteins and soluble organic materials from the wastewater. Without such chemicals, the float sludge is termed "roughing sludge" and has a fat content of 75% or higher on a dry weight basis; with such chemicals, the sludge is termed "chemical float sludge" and has a fat content that can differ greatly among treatment plants.

The chemical float sludge produced by dissolved air flotation with added chemical coagulants and flocculants from poultry slaughtering operations is a complex mixture which averages 85% to 95% water according to U.S. Pat. No. 4,933,087. The sludge has a solids content ranging from 5% to 30%, but normally averaging about 10% to 15% and contains approximately 30% to 40% protein, 10% ash and fiber, and 40% fat on a dry weight basis.

The disposal of float sludge is one of the major environmental problems facing the industry, particularly because aluminum or iron salts are commonly used to effect coagulation. It has become essential to avoid the disposal of sludges containing metals such as aluminum, zinc, copper and iron on farmland or anywhere that might expose crops and/or water supplies to contamination with these metals.

Natural sources of the flocculants include starch, starch derivatives, plant gums, seaweed extracts, cellulose derivatives, proteins, and tannins. A number of different seaweed extracts or types of algae are utilized as flocculants without the addition of metal salts. Such algae include rhodophyceae (red algae), cyanophyceae (blue-green algae), chlorophyceae (green algae) and phaeophyceae (brown algae), as well as mixtures of two or more thereof. Preferably, the algae employed is rhodophyceae, cyanophyceae and/or chlorophyceae. More preferably, the algae is rhodophyceae and/or chlorophyceae, most preferably rhodophyceae. Although all algae within these classes can be employed, the preferable algae within the class rhodophyceae includes those of the genus chondrus (for example, *c. crispus* and *c. ocellatus*), eucheuma (for example, *e. spinosum* and *e. cottonii*), gigartina (for example, acicularis, *g. pistillata, g. radula* and *g. stellata*), iridea (for example, *i. laminariodes, i. capensis* and *i. flaecida*), gymnogongrus (for example, *g. norvegicus* and *g. patens*), and gloiopeltis (for example, coloformis, *g. furcata* and *g. tenax*). The algal flocculant can be utilized in the form of a crude algal composition, a crude alkali processed algal composition as well as algae that has been mechanically processed by chopping, dicing, blending, or finely ground to form an algal flour. Synthetic polymers useful as flocculants include those that can be classified functionally as cationic, anionic, ampholytic and nonionic, such as poly(N,N-dimethylaminoethyl methacrylate), poly(ethyleneamine), poly[N-(dimethylaminopropyl)-methacrylamide], poly(2-hydroxypropyl-1,1-N-dimethylammonium chloride), poly[N-(dimethylaminomethyl)-acrylamide], poly(2-vinylimidazolinum bisulfate), polyacrylamide (PAM), poly(diallyldimethylammonium chloride), poly(ethylene oxide) (PED), and poly(vinylpyrrolidinone).

U.S. Pat. No. 4,790,943 discloses a process which preferably employs an anionic flocculant prior to a Dissolved Air Flotation (DAF) cell. The clarified water is subsequently reused, but the skimmings are not further treated but sent to "offal" presumably with the viscera and trimmings.

U.S. Pat. No. 4,913,826 teaches hydrogen peroxide may be used in a DAF cell instead of air, or alternatively used in a grease trap to float sludge to simulate a DAF cell. Hydrogen peroxide reduced the BOD of the effluent but the sludge volume was decreased only marginally, to 85%. The reduction of BOD is to be expected as hydrogen peroxide is frequently employed for that purpose. Further, substituting oxygen bubbles for air bubbles in a unit is known to reduce the BOD of the effluent.

However useful in improving the operation of a DAF cell, the prior art does not suggest a solution to the problem of eliminating the large volume of water entrained in the skimmings. The present invention overcomes the problems of the prior art processes by providing an improved process for purifying a wastewater containing fats and proteins wherein a flocculant is incorporated into the wastewater and at least part of the fats and proteins are separated from the wastewater in a dissolved air flotation cell as skimmings, the improvement comprising dewatering skimmings from the dissolved air flotation cell by the steps of (a) incorporating an effective amount of a persulfate into the skimmings to increase the volume of the solids-rich portion from step (c) by at least 10%, (b) maintaining the persulfate-containing skimmings from step (a) at a temperature of about 40° C. to about 100° C. for at least 10 minutes, and (c) separating the skimmings from step (b) into a water-rich portion and a solids-rich portion.

For the purpose of this invention the term dissolved air flotation cell, or the abbreviation DAF cell, is intended to include cells employing gases other than air, such as oxygen, nitrogen, methane or the like, as well as apparatus which simulates a dissolved air flotation cell, such as described in U.S. Pat. No. 4,913,826.

Any water soluble persulfate may be employed in the process, preferably a commercial persulfate such as sodium persulfate, ammonium persulfate or potassium persulfate. An effective amount of the desired persulfate will vary according to the active oxygen content of the persulfate, the type and proportion of flocculant in the skimmings, the temperature and the degree of separation required. One skilled in the art can easily determine the amount required for the particular skimmings without undue experimentation. Usually sufficient persulfate to provide about 0.05 to about 0.1 parts by weight active oxygen per 100 parts by weight skimmings is optional for most types of flocculating agents. For example, about 0.07 parts by weight active oxygen per 100 parts by weight skimmings (about 1% sodium persulfate) is adequate for poultry skimmings pretreated with a soluble iron salt and a polyacrylate flocculant and will provide excellent separation at about 60° C. to 80° C. If a lesser degree of separation (say 10%) is desirable, it is clear the persulfate may be reduced to about 0.01 parts per hundred parts by weight or less active oxygen for most flocculants. This is equivalent to about 0.14% by weight sodium persulfate.

The amount of persulfate may be increased substantially to provide 1 part active oxygen per 100 parts by weight skimmings or even more. (However, there is little economic benefit to employing more than 0.3 parts active oxygen per hundred parts by weight skimmings.)

The present invention employing a persulfate has an added advantage over hydrogen peroxide in that its efficacy does not require the presence of iron salts. This is a particular advantage when the red, blue-green and green algal flocculants are employed.

As with all chemical reactions the time of reaction is an inverse function of temperature. Generally, a temperature range of 40° C. to 100° C. is effective. Desirably, a temperature of 60° C. to 80° C. is optimum economically. However, one skilled in the art can easily determine the optimum temperature and time for each particular plant without undue experimentation. A 10° C. increase in temperature generally doubles the rate of reaction.

Any conventional separating means may be employed to separate the water-rich portion from the solids-rich portion, such as by decanting, centrifuging, filtering or the like. Generally it is desirable to employ a centrifuge to minimize the time and equipment size.

The present invention does not depend on any particular theoretical basis for its operation. However, it is convenient to explain the steps employed in the following examples in terms of the following theory.

In dewatering sludge from a food processing waste, such as from the processing of poultry, a combination of a soluble iron salt and a flocculating polymer, such as a polyacrylate, (or an algal-based flocculant without a metal salt) is often used to promote the initial separation between the sludge and water in a DAF cell. The flocculating agent appears to bind the sludge particles together firmly as large, stable clumps which are floated to the surface by gas bubbles and removed as skimmings. It appears that water is also firmly held in the clumps. In the present invention a persulfate is added which is believed to generate free radicals which depolymerize the flocculating agent, permitting the water, which was firmly bound into the clumps, to escape ("destabilizing the sludge"). This results in a significant improvement in the clarity of the water-rich portion and of the amount of solids-rich portion recovered from the sludge. Hydrogen peroxide was not found to be effective.

Laboratory Tests—A measured amount of peroxygen, for example, hydrogen peroxide or ammonium persulfate was added to 100 ml of poultry plant skimmings, fat-protein-water mixture separated from a DAF (dissolved air flotation cell), in a 400 ml beaker and heated to the desired temperature while stirring with a magnetic-stirrer hot plate. Fifteen minutes after the peroxygen was added, the mixture was placed in a small laboratory centrifuge for 3 minutes. The degree of separation of sludge from the aqueous portion was determined by visually comparing the samples.

Plant Tests—The usual plant procedure was the "control". It comprised treating wastewater with a ferric chloride-polyacrylate flocculant before flotation in a DAF cell. The skimmings were acidified with sulfuric acid and maintained at 60° C. to 78° C. in a mild steel reactor. After 40 minutes the treated skimmings were centrifuged.

Using the same general condition as the control, a peroxygen, either hydrogen peroxide or a persulfate were added to the skimmings either with or instead of the sulfuric acid.

EXAMPLE 1

Skimmings were treated with hydrogen peroxide or ammonium persulfate. Proportions and results are presented as Table I.

The laboratory experiments provide a qualitative estimation of how well the mixtures separated. Table I shows that the persulfates at both concentration levels showed a good separation of the water-rich portion from the skimmings. No difference could be detected between the two $H_2O_2$ runs and the control (no oxidant). This was particularly surprising because hydrogen peroxide in the presence of iron salts is known to generate free radicals.

EXAMPLE 2

Plant tests were run in which about 2,500 kg batches were processed sequentially. In the control batches only about 120 kg of a dewatered solids-rich portion were collected per hour. On the other hand, when 25 kg of sodium persulfate (1.66 kg active oxygen) was employed per batch the recovery increased to almost 320 kg of a dewatered solids-rich portion per hour without addition of sulfuric acid.

EXAMPLE 3

Example 2 was repeated except 8.6 kg of 100% hydrogen peroxide was employed (4.0 kg active oxygen) both with and without the addition of sulfuric acid. Only about 120 kg of a dewatered solids-rich portion were obtained in both cases, the same as the control.

In Examples 2 and 3 the dewatered solids-portion from the skimmings were lighter in color than the control. When persulfate was employed in Example 2 the water-rich portion from the centrifuge was much clearer indicating the presence of less solids. Clearly the present invention substantially improves the recovery of solids.

The comparison of the persulfate and hydrogen peroxide runs was surprising since it is recognized in the literature that both peroxygens will generate free radicals when heated and in the presence of heavy metals such as iron.

TABLE I

| LABORATORY SCREENING OF POULTRY WASTE SKIMMINGS | | | | | |
|---|---|---|---|---|---|
| | RUN | | | | (Control) |
| | 1 | 2 | 3 | 4 | 5 |
| Skimmings ml | 100 | 100 | 100 | 100 | 100 |
| 35% $H_2O_2$ | 2.85 | 1.0 | | | |
| $NH_4S_2O_8$-gms | | | 5.0 | 1.0 | |
| pH-initial | <7 | <7 | <7 | <7 | <7 |
| Rx time-minutes | 15 | 15 | 15 | 15 | 15 |
| Temperature °C. | 75-83 | 67-78 | 77-79 | 77-80 | 76-81 |

TABLE I-continued

LABORATORY SCREENING OF
POULTRY WASTE SKIMMINGS

| | RUN | | | | (Control) |
|---|---|---|---|---|---|
| | 1 | 2 | 3 | 4 | 5 |
| Degree Separation | Poor | Poor | Good | Good | Poor |

We claim:

1. In the process of purifying a wastewater containing fats and proteins by incorporating a flocculant into the wastewater and separating at least part of the fats and proteins from the wastewater in a dissolved air flotation cell as skimmings, the improvement comprising dewatering skimmings from the dissolved air flotation cell by the steps of (a) incorporating an effective amount of a persulfate into the skimmings to increase the volume of the solids-rich portion from step (c) of at least 10%, (b) maintaining the persulfate-containing skimmings from step (a) at a temperature of about 40° C. to about 100° C. for at least 10 minutes, and (c) separating the skimmings from step (b) into a water-rich portion and a solids-rich portion.

2. The process of claim 1 wherein sufficient persulfate is added to provide between about 0.01 to 1 parts by weight active oxygen per hundred parts by weight skimmings.

3. The process of claim 1 wherein the temperature of the skimmings in step (b) is maintained between about 60° C. and about 80° C.

4. The process of claim 2 wherein the temperature of the skimmings in step (b) is maintained between about 60° C. and about 80° C.

5. The process of claim 1 wherein the skimmings are separated by a centrifuge.

6. The process of claim 2 wherein the skimmings are separated by a centrifuge.

7. The process of claim 3 wherein the skimmings are separated by a centrifuge.

8. The process of claim 4 wherein the skimmings are separated by a centrifuge.

* * * * *